United States Patent [19]
Davies et al.

[11] Patent Number: 6,108,701
[45] Date of Patent: Aug. 22, 2000

[54] SOFT SWITCH EXTENSION FOR INTERNET PROTOCOL APPLICATIONS

[75] Inventors: Bryan R. Davies, Aurora; James P. Dunn, Sandwich, both of Ill.

[73] Assignee: Lucent Technologies, Inc., Murray Hill, N.J.

[21] Appl. No.: 09/119,380

[22] Filed: Jul. 20, 1998

[51] Int. Cl.[7] .......................... G06F 15/173; G06F 15/16
[52] U.S. Cl. ........................................... 709/224; 709/203
[58] Field of Search ..................................... 709/224, 203

[56] References Cited

U.S. PATENT DOCUMENTS

| | | | |
|---|---|---|---|
| 5,905,868 | 5/1999 | Baghai et al. | 709/224 |
| 5,951,694 | 9/1999 | Choquier et al. | 714/15 |
| 5,961,601 | 10/1999 | Iyengar | 709/229 |
| 5,987,515 | 11/1999 | Ratcliff et al. | 709/224 |

*Primary Examiner*—Krisna Lim

[57] ABSTRACT

An improved TCP/IP protocol for use in a client/server network is disclosed. The improved protocol allows a server to switch execution of an application from one processor or task to another processor or task without interruption of the IP connection or serious delay in execution of the application by a server or client. As implemented, each server usually includes a unique hardware address, an improved IP layer with a shared IP address, a "Speak No Evil-Communication Protocol" layer with a unique SNE-CP address, a soft switch protocol ("SSP") layer with at least one unique SSP address assigned to a process or task, usually a TCP layer, at least one SSP monitoring process and a processor executing at least one software application. In this invention, each server typically receives each message packet from each client; however, only one server is allowed to respond to the client's message. Thus, in the event that one processor or task faults, the application can be switched to another processor or task without interruption of the IP connection or serious delay in execution.

17 Claims, 12 Drawing Sheets

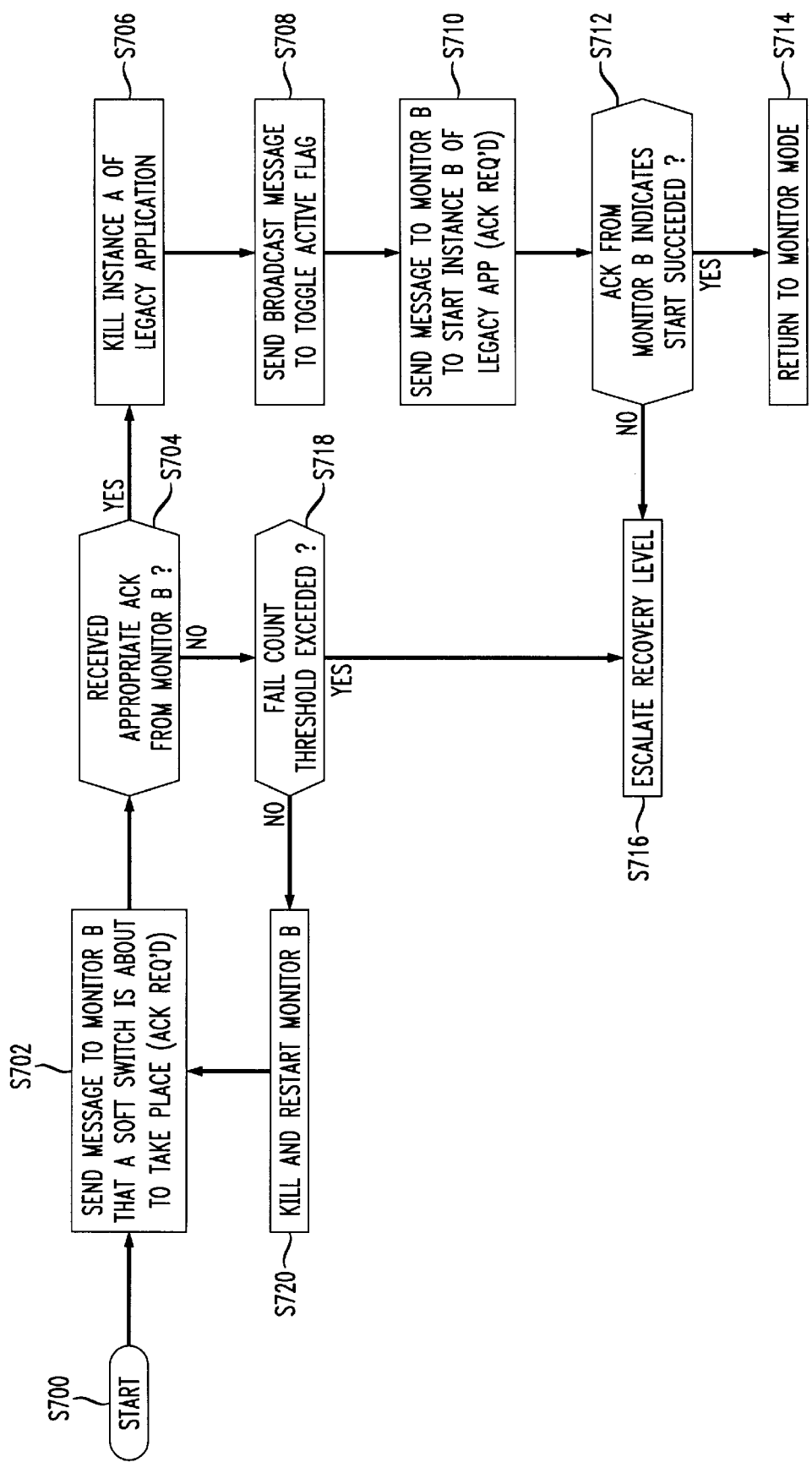

SOFT SWITCH EXTENSION FOR INTERNET PROTOCOL APPLICATIONS

FIELD OF THE INVENTION

This invention relates to Internet Protocol connections. In particular, this invention pertains to a system that switches execution of an application from one processor or task to another processor or task without interruption of the Internet Protocol connection or serious delay in execution of the application by a server or client.

BACKGROUND OF THE INVENTION

The various protocols of the TCP/IP suite as well as Client/Server networks are well known in the art. Internet Protocol ("IP") is a networking protocol that provides a basis for communication across interconnected networks, between computers with diverse hardware architectures and various operating systems. IP provides a structure for addressing nodes on the network for routing datagram messages from one node on the network to another using these "IP Addresses." Transmission Control Protocol ("TCP") is another networking protocol that uses the services that IP provides, but adds the ability for one node on the network to communicate with another via a virtual connection that guarantees in-order delivery of a stream of data packets in both directions. The combination of the two is known in the art as "TCP/IP," and there are many protocols to provide various types of services that are layered atop this pair. File Transfer Protocol ("FTP"), as an example, is a very commonly used protocol that allows a computer to access files on other computers on the network, and forms the basis of tools that allow user access to file archives around the world that are linked to the Internet. The Domain Name System ("DNS") is a service based on TCP/IP, and provides a mechanism for efficiently mapping IP Addresses to symbolic network node names. In a client/server network, clients are devices and software that request information or applications from servers. Servers are shared computers on a network. Under TCP/IP, IP and FTP, each server on a client/server network has a unique 32-bit number (i.e. an "IP Address") assigned thereto for identification purposes, and usually has a unique symbolic name assigned as well. Translation between IP Addresses and symbolic node names is usually accomplished via a "DNS Server" which is a computer with a known IP Address that accepts and responds to name/address translation requests.

The problem with the use of TCP/IP based protocols in existing client/server networks can be readily seen when a server is taken out of service. For example, when a server's administrator needs to add an application, the server must be taken out of service so the application can be installed and the server can be reinitialized. However, when the server is taken out of service, other applications running on the server are interrupted and must be restarted. Consequently, connections between clients and that server are terminated, and new connections to that server's IP address will be refused or unacknowledged. In order to circumvent this problem, the prior art uses a configuration (shown in FIG. 1) whereby servers 100, 102 are arranged in an array behind a router 106. DNS Server 112 is used to translate the symbolic name of the server to an IP address on Local Area Network 204. In this prior art configuration, when server 100 is removed from service, incoming client service requests must be redirected to another server, in this case server 102. Changing the name/address translation tables in DNS server 112 is usually the method used for accomplishing this.

Using the prior art configuration, clients originally connected to a lost server must restart communications in order to connect to other members of the server array. However, this recovery method may not work until the translation tables in the DNS server have been updated. Thus, whenever a server is taken out of service, IP connections are interrupted and application execution by servers and/or clients are seriously delayed. Accordingly, it is an object of the present invention to provide servers with the ability to soft switch TCP/IP connections and applications to another TCP/IP engine without negatively impacting clients connected to the servers.

SUMMARY OF THE INVENTION

In the multiple server embodiment of the present invention, a plurality of servers in a client/server network use an improved IP protocol layer. This improved IP protocol layer includes the traditional IP protocol, unchanged from its current specification in the art, plus two new protocols. The Speak No Evil-Communication Protocol ("SNE-CP") is the first new protocol of the improved IP protocol layer, and enables the individual servers within the plurality of servers to communicate with each other. The Speak No Evil-Internet Protocol ("SNE-IP") is the second new protocol of the improved IP protocol layer and enables an active server in the plurality to transparently echo all IP traffic to other servers in the plurality. Both of these new protocols are peers of the IP protocol.

Each server includes a processor executing a software application and a computer-readable medium. Each server has a shared IP address stored on its computer-readable medium with the same IP address as the other servers in the plurality. Since the same IP address is used, the plurality of servers collectively appear as one virtual (i.e. logical) server to clients. Each server also has an active server flag stored in the computer-readable medium that identifies the server as being active when the active server flag is set. In addition, each server has another address, called the SNE-CP address, assigned to it that is used to uniquely identify that server from the others in the plurality of servers. Both the active server flag and the SNE-CP address are generally part of the improved IP protocol layer. As with the prior art, each server also has an interface to the client/server network that has a unique hardware address, usually called the MAC address, identifying the server to a router on the client/server network.

Each server also includes a monitoring process that monitors execution of the software applications executing on that server. The monitoring process detects processor or task faults, and handles switching of the application from one processor or task to another. Monitoring processes in various members of the plurality of servers communicate with one another using the SNE-CP protocol to transport messages from one server in the plurality to another. Each server also uses an additional new protocol, the Soft Switch Protocol ("SSP") that defines the semantics of communication between monitoring processes. Each monitoring process has assigned to it a unique SSP address.

During normal operation, the router sends all IP traffic to the active server in the plurality. This happens automatically and is a result of the existing protocols of the IP protocol suite, since the router associates all traffic for an IP address to a specific MAC address. The active server with its improved IP protocol echoes this IP traffic back out to the other servers in the plurality using the SNE-IP protocol. When it is necessary to make another server active, messages are sent between members of the plurality of servers using the SSP and SNE-CP protocols, under the control of the monitoring processes.

Thus, each server generally receives all client requests and each server may mirror actions performed by the active server; however, only the active server is allowed to respond to client requests.

A similar configuration is used in the single server embodiment of the present invention. Again, a server in a client/server network uses an improved IP protocol. The server includes a computer-readable medium as well as a processor executing a first software application and a second software application. The server also includes a first monitoring process that monitors the processor's execution of the first software application, and a second monitoring process that monitors the processor's execution of the second software application. First and second active process flags respectively identify whether the first or second software application is active. These active process flags are contained in the monitoring processes. In this embodiment, the software applications have been written such that each is aware of the monitoring processes, and can communicate with its monitoring process via the SSP and SNE-CP protocols. Based on the state of the active process flag in the monitoring processes, only the active software application transmits or receives data to a client across the network. If a task fault occurs and is detected, the monitoring processes coordinate switching to a standby process and/or restart the faulted process using the SSP and SNE-CP protocols.

Thus, in both embodiments, the improved IP protocol disclosed herein enables a server to switch execution of an application from one processor or task to another processor or task without interruption of the IP connection or serious delay in execution of the application by a server or client.

BRIEF DESCRIPTION OF THE DRAWINGS

The invention may take physical form in certain parts and steps, preferred embodiments of which will be described in detail in this specification and illustrated in the accompanying drawings which form a part hereof, wherein:

FIG. 7 shows a flow chart illustrating a soft switch, performed in accordance with the soft switch protocol, from monitoring process A to monitoring process B.

DETAILED DESCRIPTION OF THE PREFERRED EMBODIMENTS

Figure 1:
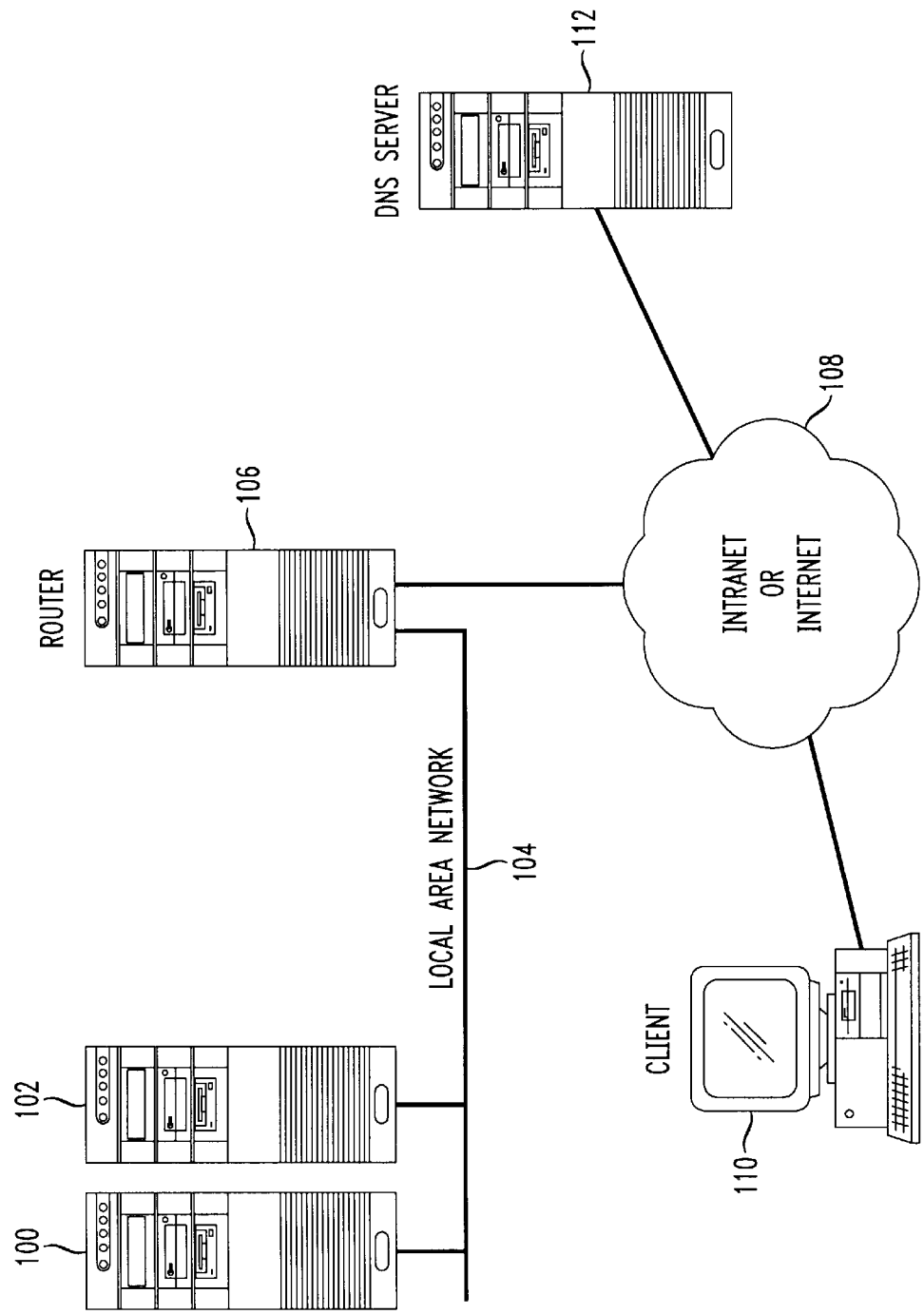
FIG. 1 shows a simplified schematic of a prior art configuration in which servers and a router on a local area network are connected via an Intranet or the Internet to a client.
Figure 2A:
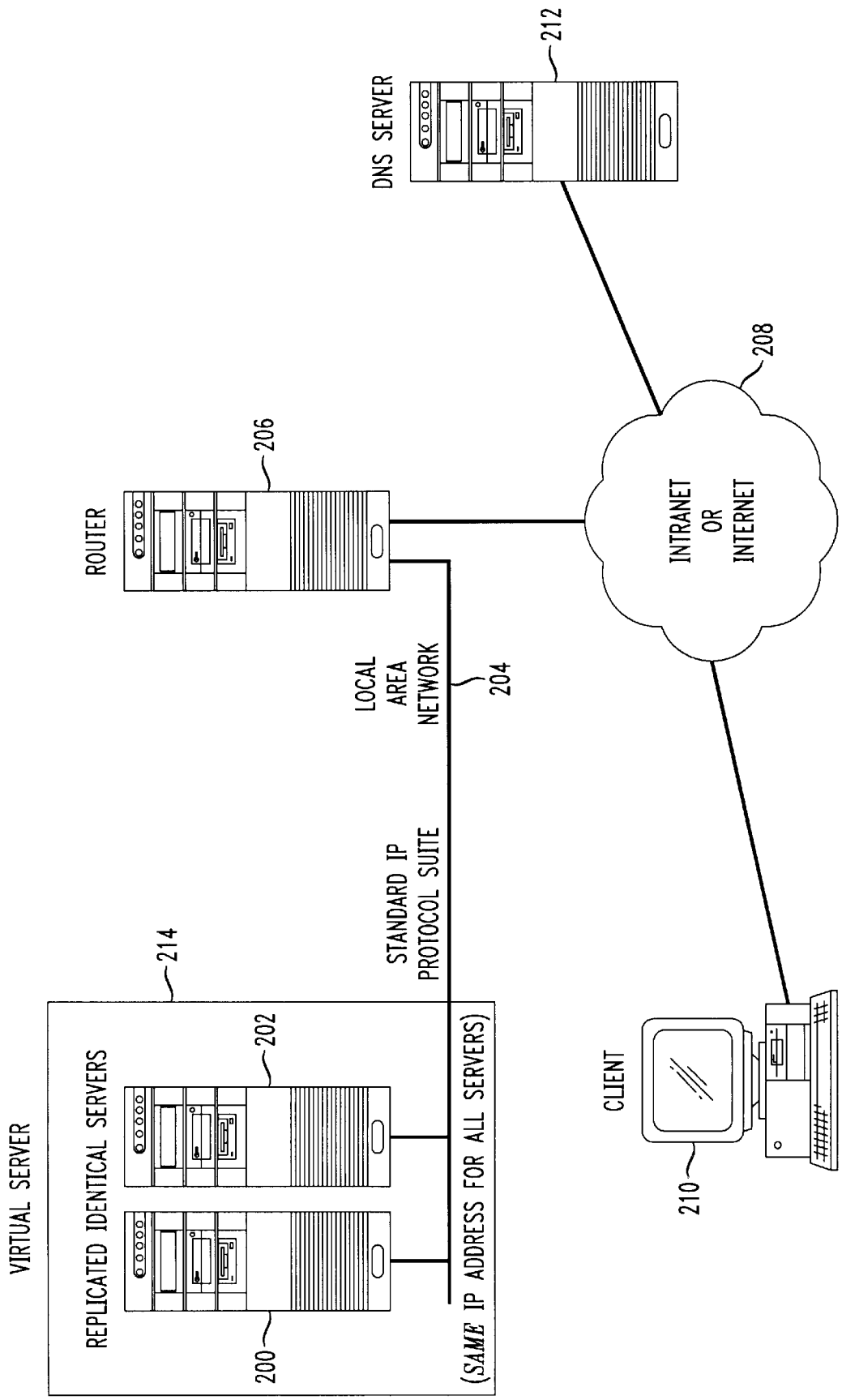
FIG. 2A shows a simplified schematic of a multiple server embodiment of the present invention in which a plurality of servers are assigned the same IP address and are coupled to a router that is connected via an Intranet or the Internet to a client.

With reference now to the figures and in particular with reference to FIG. 2A, a simplified schematic of the preferred multiple server embodiment of the present invention is depicted. In this embodiment, a plurality of servers 200, 202 are assigned the same IP address on a local area network ("LAN") 204. A router 206 is coupled to the LAN and connects the servers 200, 202 via an Intranet or Internet 208 to a client computer 210. Also coupled to the LAN is a DNS Server 212 that is used for "name to IP address" translation. The plurality of servers 200, 202 thus appear as one logical host (i.e. a virtual server) 214 to the client 210 and also to the DNS Server 212, because the servers 200, 202 share the same IP address and host name.

Figure 2B:
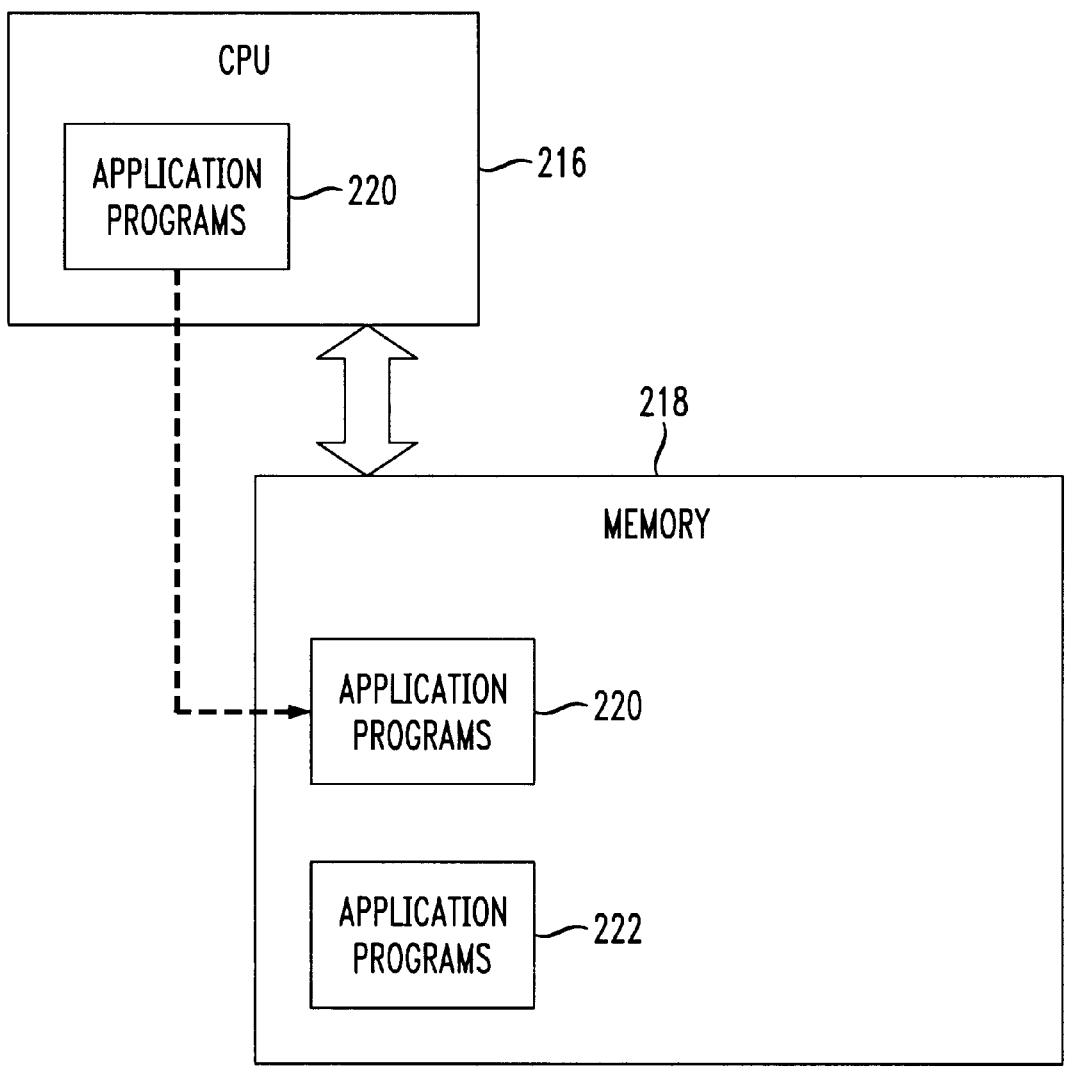
FIG. 2B shows a simplified block diagram of a typical server as used in the present invention.

FIG. 2B shows a simplified block diagram of a server 200, 202 used in the present invention. Each server 200, 202 includes a central processing unit (CPU) 216 and a memory 218. CPU 216 can be any standard and commonly known central processing unit, and memory 218 can include magnetic core, semiconductor RAM, magnetic disks and magnetic tapes, or any other known memory device. CPU 216 can also represent several independently running central processing units which may be executing application programs (i.e. application software) 220, 222 that are stored in at least one region of at least one range of memory addresses in memory 218.

Figure 3A:
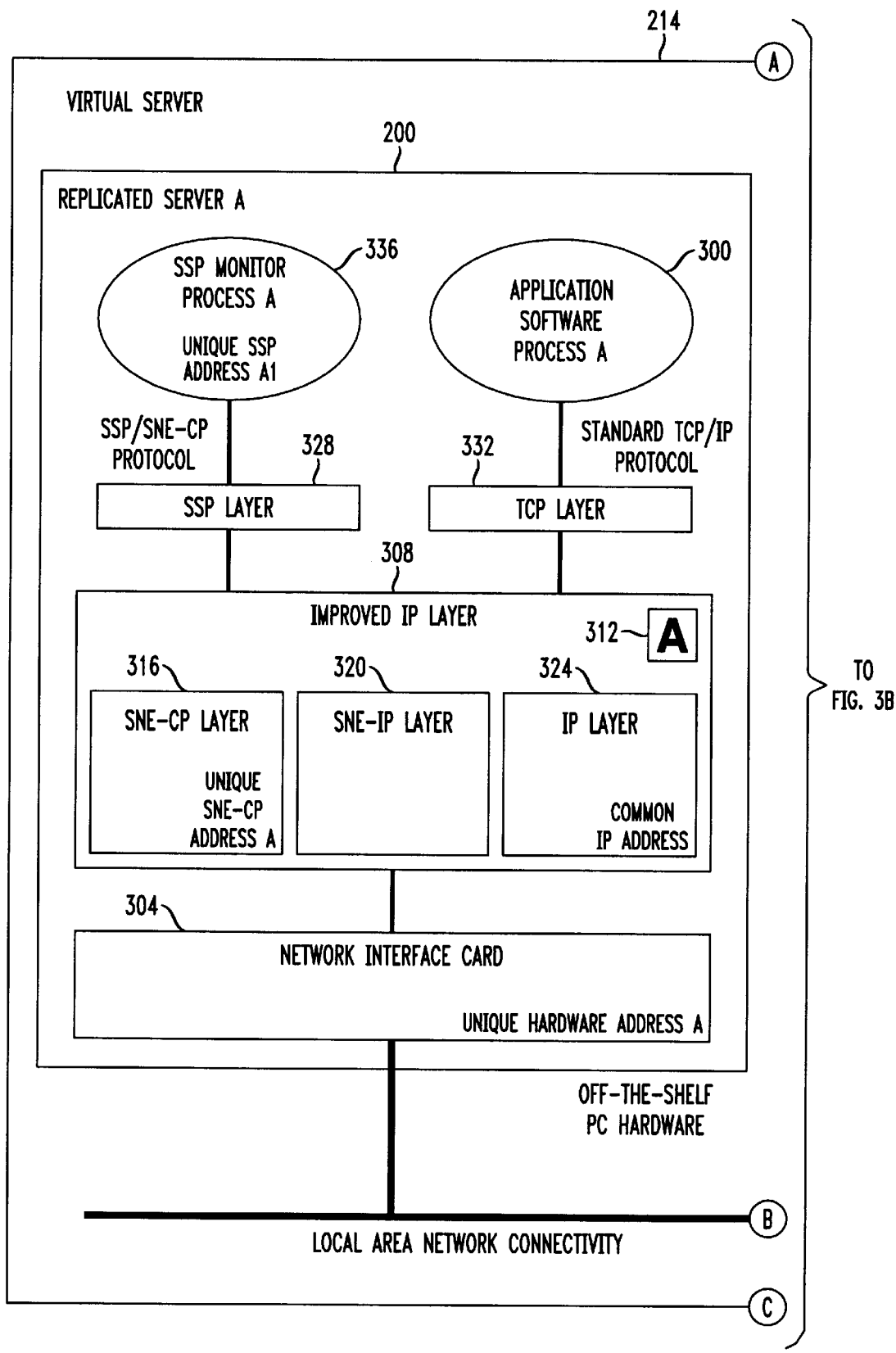
FIG. 3 shows a simplified functional block diagram of the software functions within a multiple server embodiment of the present invention in which the servers are executing commercially available software applications (i.e. legacy applications)
Figure 3B:
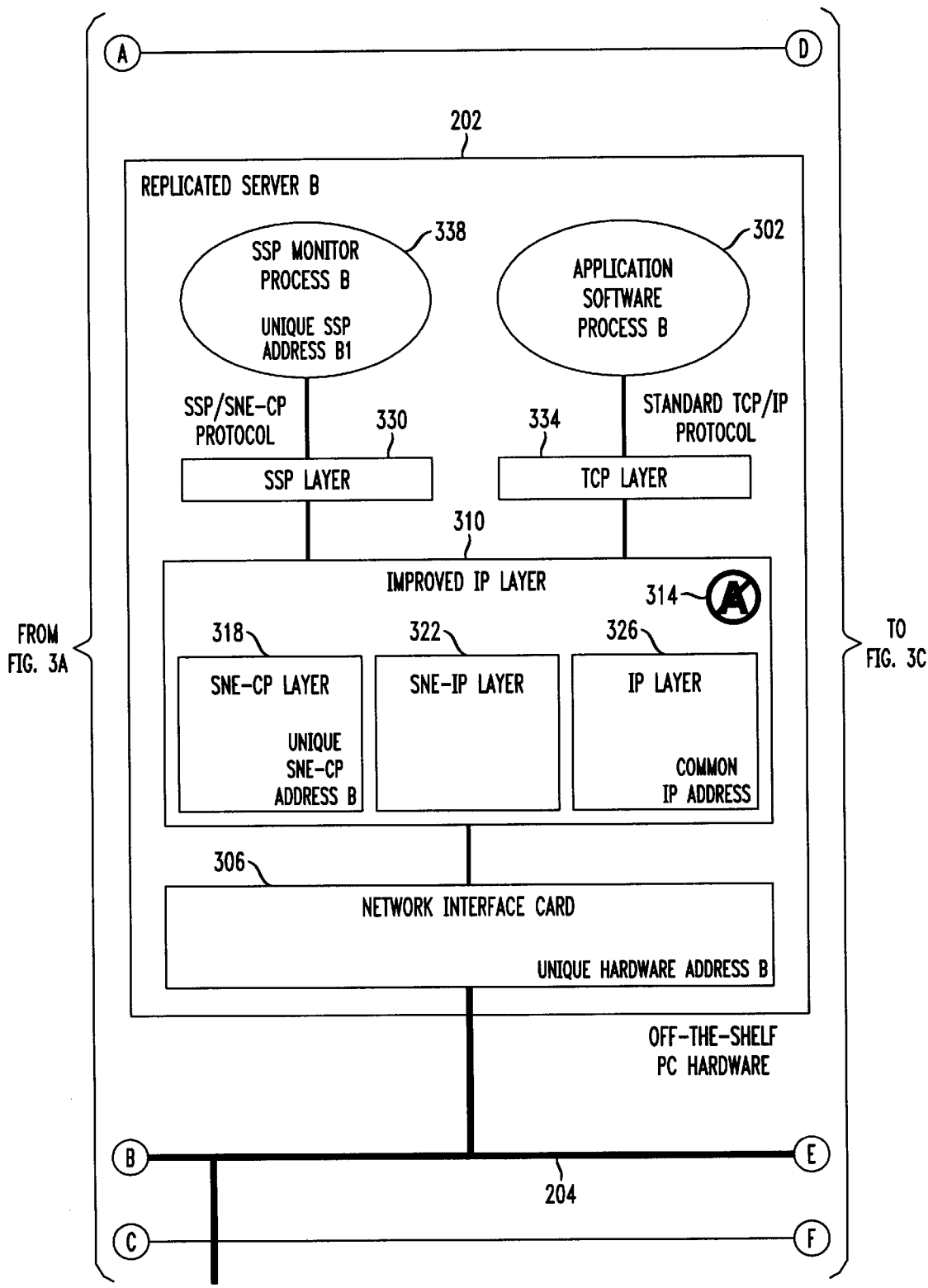
Figure 3C:
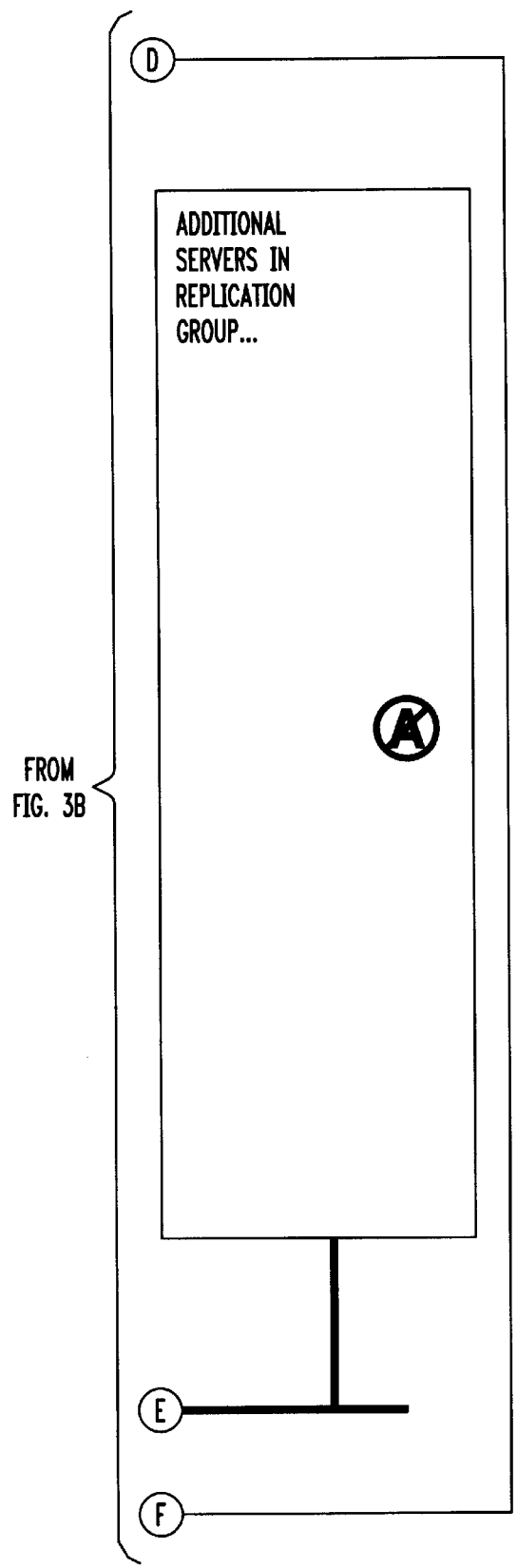

FIG. 3 shows a simplified functional block diagram of the software functions within a multiple server embodiment of the present invention. In this diagram, the servers 200, 202, are executing commercially available software applications (i.e. legacy applications) 300, 302 such as standard web server software. The software applications 300, 302 need only be functionally equivalent. For example, application 302 can be a mirror image of application 300, a restarted instance of application 300, or a standby process of application 300. Thus, if software application 300 on the active server 200 were to fault or if the server 200 was taken out of service, application execution would be "soft switched" to the replicated server 202. In other words, software application 302 on the replicated server 202 would start responding to requests from the client 210. As used herein, a "soft switch" is defined as the ability to move the execution of an application from one processor or task to another processor or task without interruption of the IP connection or serious delay in the execution of the application by the server or the client.

The software functions involved in performing soft switches in a multiple server embodiment are depicted in FIG. 3. Each server 200, 202 connected to the LAN 204 has a network interface card 304, 306. Any standard network adapter suitable for use on the particular LAN 204 (i.e. Ethernet, token ring, etc.) can be used as the network interface cards 304, 306. The network interface cards 304, 306 provide each server 200, 202 with a unique hardware address. The router 206 uses the unique hardware addresses to identify and distinguish between the servers 200, 202. Nevertheless, the servers 200, 202 still appear as one virtual server 214 to the client 210.

Again, the reason the servers 200, 202 appear to be one virtual server 214 is because the servers 200, 202 share the same IP address. The IP address in the present invention is stored in the improved IP layer 308, 310 in each server 200, 202. All improved IP layers 308, 310 of a replicated server 200, 202 have the same IP address, and therefore appear as one virtual server 212 to the client 210. Associated with each improved IP layer 308, 310 is a flag 312, 314. When the flag 312 is set, the server 200 is active, and server 202 is inactive (flag 314 is not set). Conversely, when the flag 314 is set, the server 202 is active, and server 200 is inactive (flag 312 is not set).

Only the active server 200 will receive client messages and requests directly from the client 210, but the active server echoes these messages using the SNE-IP protocol to all other inactive servers in the server plurality so that all servers, both active and inactive, have access to these messages and requests. Although both active and inactive servers 200 and 202 receive client messages and requests, the improved IP layers 308, 310 only allow active server 200 to respond to client 210 requests. Nevertheless, the improved IP layers 308, 310 allow both active and inactive servers 200, 202 to respond to soft switch protocol ("SSP") messages.

Contained within the improved IP layers 308, 310 is the standard IP layer 324, 326 that is well known in the art. IP packets addressed to virtual server 214's single IP address are routed to the active server 200 by router 206. This occurs because router 206 contains a mapping table that associates the hardware address of the active server 200 with the shared IP address. The address table in router 206 is initialized and maintained using the Address Resolution Protocol ("ARP") in accordance with the art. Messages from client 210 are thus only sent to the active server by router 206. IP layer 324, 326 hands any incoming packets up to the next higher protocol layer, which in this case is the improved IP layer 308, 310. Outgoing messages are simply transmitted onto the LAN through network interface card 304, 306.

SNE-IP Layers 320, 322 are also contained within improved IP layers 308, 310. SNE-IP layers 320, 322 echo all incoming and outgoing IP traffic back out to the LAN under a different protocol ID number so that all of the servers within a server replication group (i.e. virtual server 214) have access to all of the IP traffic that active server 200 is receiving and sending. When an incoming IP packet is received by IP layer 324 in the active server 200, the improved IP layer 308 both transmits the packet up to the higher protocol layers and also gives the packet to SNE-IP layer 320 for retransmission. SNE-IP layer 320 simply changes the protocol ID number from the number used for IP to the number used for SNE-IP, and transmits the message onto LAN 204 (through network interface card 304) with the destination hardware address of the message specified to be the broadcast hardware address. All computers on LAN 204 receive this packet. Active server 200, which sent the packet, ignores it because of the state of its active flag 312. Inactive server 202 receives the packet and may process it to allow the inactive application software process 302 to keep track of the application state of the active application software process 300. Other computers and router 206 on LAN 204 also receive this packet, but ignore it because they will not recognize the protocol type.

Also contained within improved IP layers 308, 310 are the SNE-CP Layers 316, 318, which enables servers contained within a replication group (such as servers 200, 202 contained within the virtual server 214) to communicate with each other. IP cannot be used for messages between server 200 and 202 because they share the same IP address. Therefore the SNE-CP layer assigns a unique SNE-CP address to each server, and allows messages to be transmitted between servers in the same replication group, or even to servers in another replication group. The SNE-CP layer will use a different protocol ID number than either the IP or SNE-IP protocols, and computers and routers other than those recognizing this protocol ID will ignore these messages.

The improved IP layers 308, 310 coordinate the activities of its IP, SNE-IP, and SNE-CP sub-layers. While server 200 is active, as evidenced by the state of active flag 312, improved IP layer 308 allows traffic to flow unobstructed between the IP layer and higher protocol layers, and also echoes this traffic back to LAN 204 using the SNE-IP layer and protocol. While server 202 is inactive, improved IP layer 310 blocks outgoing IP traffic so that no IP traffic appears from this server. Incoming IP traffic may be handled to keep track of application state information, or may simply be discarded, depending on the implementation. As messages are received by the network interface cards 304, 306, the improved IP layers separate IP messages, SNE-IP messages, and SNE-CP messages, and where appropriate, messages are transmitted to the next higher protocol layer. The improved IP layers 308, 310 provide the SNE-CP messages to the SSP layer 328, 338, by way of the SNE-CP layer. The improved IP layers 308, 310 provide the TCP messages to the standard TCP layer 332, 334 in each server 200, 202 by way of the standard IP layer components 324, 326. In the active server 200, all IP messages are also retransmitted out to LAN 204 via the SNE-IP layer.

The SSP layers 328, 330 provide each server 200, 202 with an application interface layer for reliability and recovery operations. A unique SSP address is assigned to any SSP-aware process in servers 200, 202, such as the SSP Monitor Processes 336, 338. SSP layers 328, 330 distribute inbound messages to the appropriate process based on the SSP destination address of the message. Outgoing messages (identified by virtue of the fact that the SNE-CP address is that of another server) are handed off to the improved IP layer for transmission over LAN 204 to another server in the replicated group (i.e. virtual server 212).

The SSP monitor processes 336,338 are software routines that monitor the health of software applications 300, 302. In addition, each SSP monitor process 336, 338 monitors the sanity of other servers in the replicated group (i.e. the virtual server 214). The SSP monitor processes 336, 338 are written against the SSP and SNE-CP layers 328, 330, 316, 318, and use the services provided by those layers. In general, the SSP monitor processes 336, 338 are designed and customized by individual software developers. However, specific monitoring tasks performed by the SSP monitor processes are discussed below in reference to FIGS. 6A, 6B and 6C.

Under normal operating conditions, the active server 200 and the replicated server 202 operate as follows in the preferred, multiple server embodiment of the present invention. On initial startup, no server is active. The first server to be started will become the active server. Server 200, upon initial boot and in accordance with the present art, broadcasts an ARP message to LAN 204, which is received by router 206. This message identifies the unique hardware address for and the IP address being used by server 200. Router 206 enters this IP address/hardware address pair into its routing tables, and routes all IP traffic addressed to that IP address to server 200. At this point, the operation of this embodiment of the invention diverges from the prior art operation. Server 200 sends an SNE-CP broadcast message to the LAN. This is a message using the SNE-CP protocol ID, with the destination hardware address specified to be the broadcast hardware address, and a destination SNE-CP address specified to be the broadcast SNE-CP address. The message contains as data the IP address of the server as well, and instructions for the active server of this IP address server group to respond. If there is no response to this first SNE-CP message within a timeout period, then the server 200 knows that it is the first and/or only server that is operational at that time in that server replication group (virtual server 214). Accordingly, server 200 then proceeds to set its flag 312 to show the server 200 as being active. When server 202 boots, it also broadcasts an ARP message to LAN 204, which is received by router 206. This message identifies the unique hardware address for and the IP address being used by server 202. In this case, the IP address matches that used by server 200. Router 206 updates its routing tables to use this new IP address/hardware address pair, temporarily causing IP traffic to be routed to server 202. Server 202 then sends the same SNE-CP broadcast message to the LAN using the SNE-CP protocol ID, with the destination hardware address specified to be the broadcast hardware address, and a destination SNE-CP address specified to be the broadcast SNE-CP address. The SNE-CP broadcast message also contains the IP address of the server and instructions for the active server of this IP address server group to respond. However, server 200 is already active, and so it responds that it is the active server. Server 200 then also broadcasts an additional ARP message to LAN 204 to reset the IP address/hardware address tables in router 206 back to the correct values. When server 202 receives the message from server 200 that the active server is server 200, server 202 then updates its flag 314 to indicate that server 202 is an inactive server.

There is a short interval in time during which some IP packets may be delivered in error to inactive server 202 by the router, but this is not problematic since the IP protocol does not guarantee or acknowledge packet delivery. Accordingly, the improved IP protocol simply discards any inbound IP packets until the active flag indicates that this server is active. This occurs in server 200's boot sequence after the timeout period has expired. During server 202's subsequent boot sequence, any IP packets delivered to inactive server 202 during the boot process will be discarded since server 202's active flag 314 is never set to indicate that server 202 is active. Active server 200 reestablishes the correct mapping in the router 206 after a very short interval of time, once it notices that inactive server 202 is on the network.

After all of the members of the replicated group (virtual server 214) have been started and are in operation, router 206 forwards all IP messages from any client outside of LAN 204 only to the active server 200. Network interface card 304 provides these IP messages to IP Layer 324, which provides the data stream to the TCP layer 332, and then to the software application 300. Responses to the messages are sent back from the software application 300 to the TCP layer 320, through the IP layer 324, and out through network interface card 304 to the network. All of this occurs only if flag 312 in the improved IP layer 308 indicates that this server is active. In parallel, network interface card 304 also provides inbound IP messages to SNE-IP layer 320, which repackages the messages under a different protocol ID number (the one associated with SNE-IP) and retransmits them out through the network interface card using a broadcast hardware address. None of the IP traffic that router 206 sends to active server 200 is handled by inactive server 202's network interface card. However, all of the SNE-IP traffic that is broadcast by active server 200 is received by inactive server 202's network interface card 306. Network interface card 306 provides these encapsulated IP messages to SNE-IP Layer 322. Depending on the implementation, several options are available. The improved IP layer 310 may choose to discard all packets, thereby ignoring traffic when server 202 is not the active server, as determined by active flag 314. Or, the improved IP layer 310 may instead be implemented to forward all IP traffic up to the TCP layer 334, which forwards the traffic to application software process 302. Outgoing traffic from the application software process 302 would be transmitted down through the improved IP layer 310, where it would be throttled and not allowed to proceed (since server 202 is not the active server). The only requirement for inactive server 202 is that it never send any IP traffic out to LAN 204 as long as it is inactive. Inactive server 202 may monitor traffic provided via the SNE-IP stream, but it may not participate in the IP conversations. The term "Speak No Evil" is derived from this characteristic of inactive server 202's interface to the network.

Nevertheless, active and inactive servers 200, 202 within the virtual server 212 are always permitted to "speak" to each other. Replicated servers 200, 202 send messages to each other by sending SSP/SNE-CP messages to each other. More particularly, these messages are sent to other servers 200, 202 in the replicated server group 212 by sending a SSP/SNE-CP protocol message with SNE-CP and SSP addresses of the destination server and process, respectively. SSP/SNE-CP messages also identify the source SSP and SNE-CP addresses of the sender of the message. The SNE-CP layers 316, 318 forward the SSP/SNE-CP messages up to their respective SSP layers 328, 330 and corresponding SSP monitoring processes 336, 338. SSP/SNE-CP messages are not limited to SSP monitoring processes only. If an application designer chooses to design application software 300, 302 to be "SSP aware," then these processes may also send and receive SSP/SNE-CP messages.

Figure 6A:
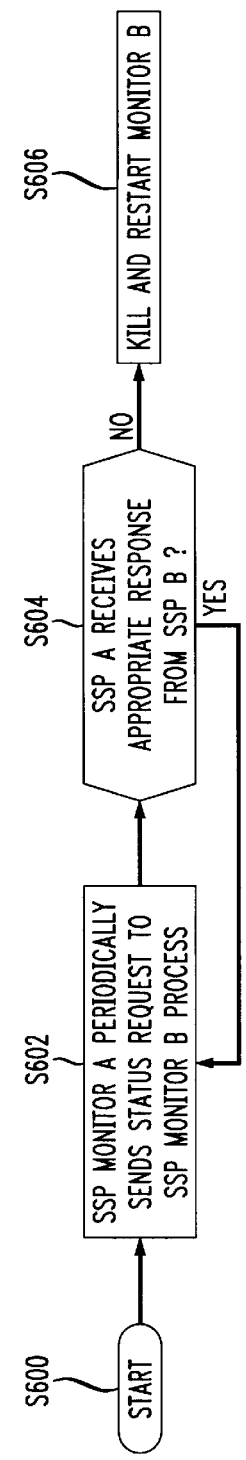
FIGS. 6A, 6B and 6C show flow charts illustrating the monitoring tasks performed by the soft switch protocol ("SSP") monitoring processes.
Figure 6B:
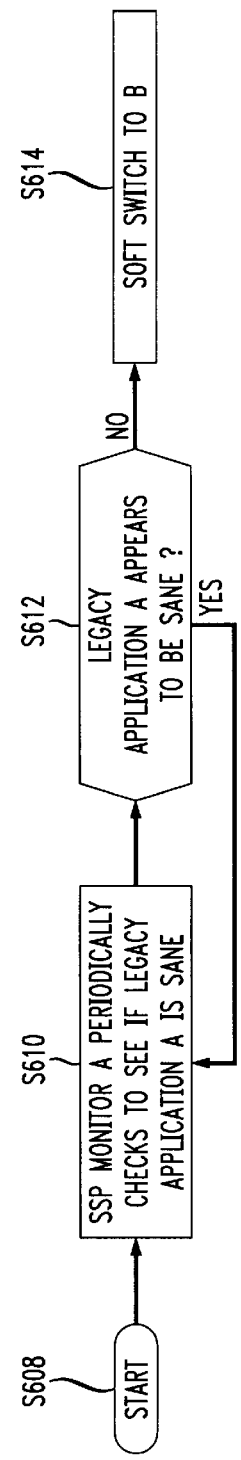
Figure 6C:
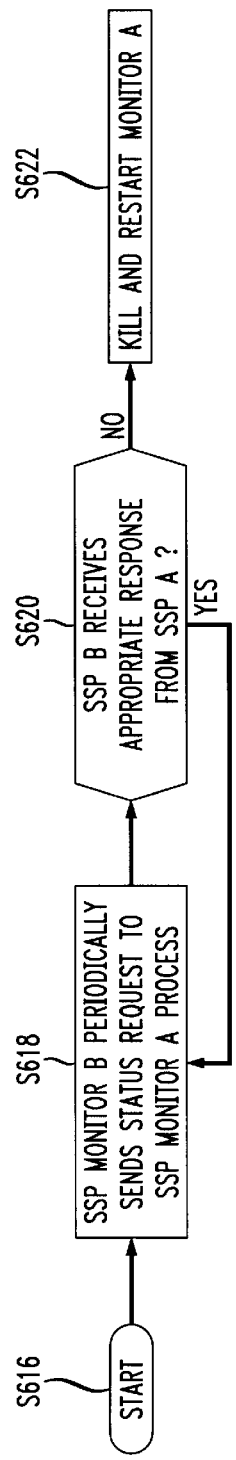

As illustrated in FIGS. 6A, 6B and 6C, the SSP monitor processes 336, 338 perform a number of functions during operation. For example, after being started (S600) an SSP monitor process 336 periodically sends a status request to another SSP monitor process 338 (S602). If SSP monitor process 336 receives an appropriate response from SSP monitor process 338 (S604), then SSP monitor process 336 will request another status request later (S602). If SSP monitor process 336 does not receive an appropriate response from SSP monitor process 338 (S604), SSP monitor process 338 is terminated and restarted (S606).

Of course, SSP monitor process 338 for inactive servers 202 also perform checks on other SSP monitor processes 336. For example, after being started (S616), SSP monitor process 338 periodically sends a status request to SSP monitor process 336 (S618). If SSP monitor process 338 receives an appropriate response from SSP monitor process 336 (S620), then SSP monitor process 338 will request another status request again later (S618). If SSP monitor process 338 does not receive an appropriate response from SSP monitor process 336 (S620), SSP monitor process 336 is terminated and restarted (S622).

Another task performed by SSP monitor processes 336, 338 is shown in FIG. 6B. After being started (S608), an SSP monitor process 336 periodically checks to see if a software application 300 is sane (i.e. has not faulted) (S610). In the event of a fault or some other problem (S612), a soft switch to another server 202 is made (S614). If the SSP monitor process 336 determines that the software application 300 is sane (S612), then the monitor process 336 checks the software application again later (S610). SSP monitor processes can be written to enable legacy application soft switches, or entire server soft switches.

One method for performing a soft switch from an active server 200 to an inactive server 202 is shown in FIG. 7. After being started (S700), an SSP message is sent to a SSP monitor process 338 that a soft switch is about to take place (S702). If an appropriate acknowledgment (S704) is received from monitor process 338, then software application 300 is terminated (S706). A message is then sent (S708) to the improved IP layers 308, 310 to toggle their flags 312, 314 to either the active or inactive setting. A message is then sent to SSP monitor process 338 to start software application 302 (S710). If an appropriate acknowledgment is received from SSP monitor 338 (S712), then the software start was successful and the SSP monitor processes 336, 338 return to monitor mode (S714). If acknowledgment is not received from SSP monitor 338 (712), then recovery attempts are escalated (S716). Attempts could, for example, escalate from simply attempting to kill an individual process on the misbehaving server to automatically power cycling the server using an externally controllable power source for the server.

Alternatively, if an appropriate acknowledgment was not received from SSP monitor process 338, the number of messages to which the SSP monitor process 338 failed to respond is examined (S718). If the number of messages to which the SSP monitor process 338 failed to respond exceeds some predetermined fail count threshold (S718), then recovery attempts are also escalated (S716). If, however, the number of messages is less than the fail count threshold (S718), then the SSP monitor process 338 is terminated and restarted (S720). The process is then reinitiated by sending another message to SSP monitor process 338 (S702) that a soft switch is about to take place.

Figure 4A:
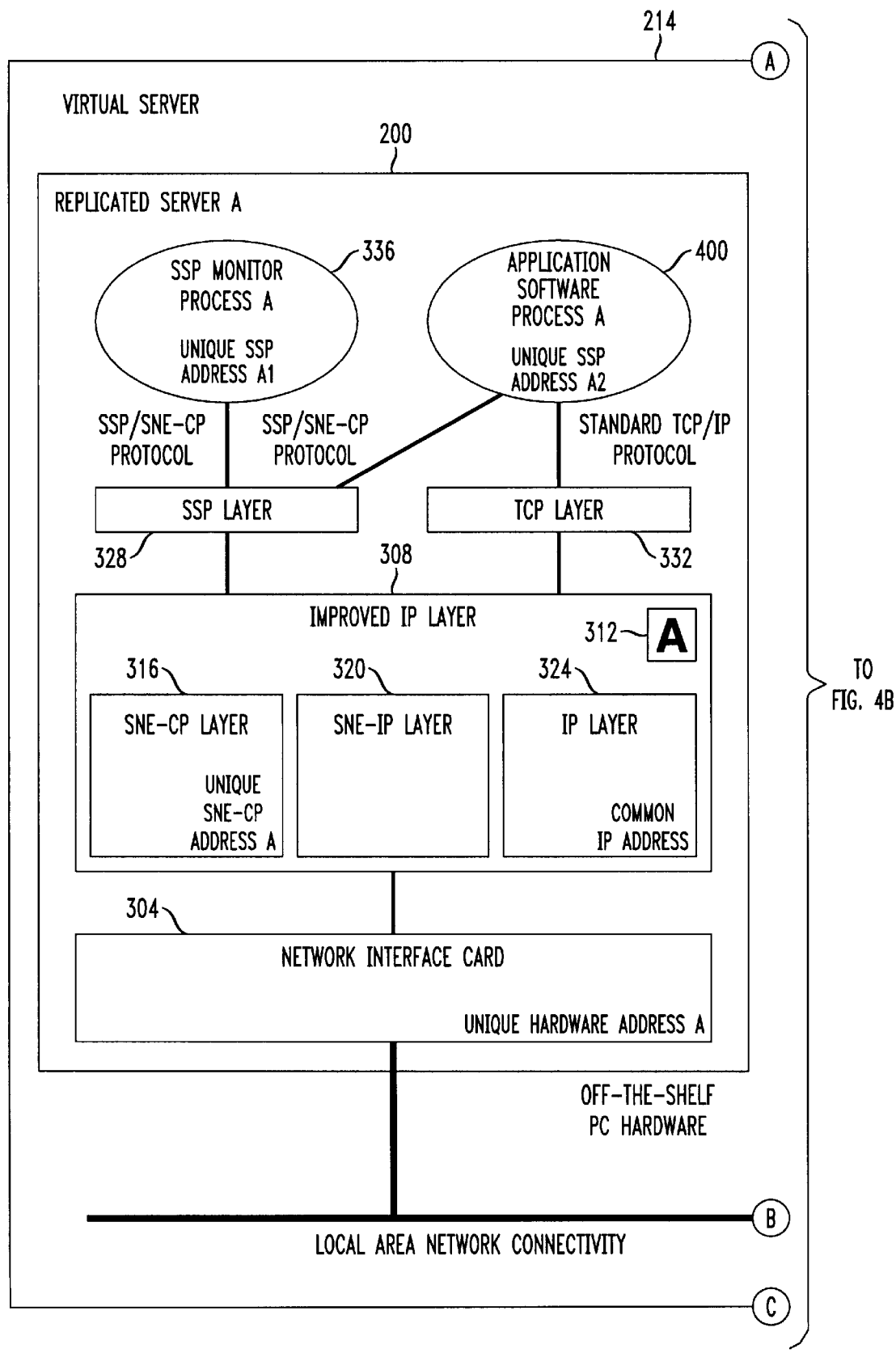
FIG. 4 shows a simplified functional block diagram of the software functions within a multiple server embodiment, in which the servers are executing software applications specifically designed to take advantage of the present invention (i.e. non-legacy applications)
Figure 4B:
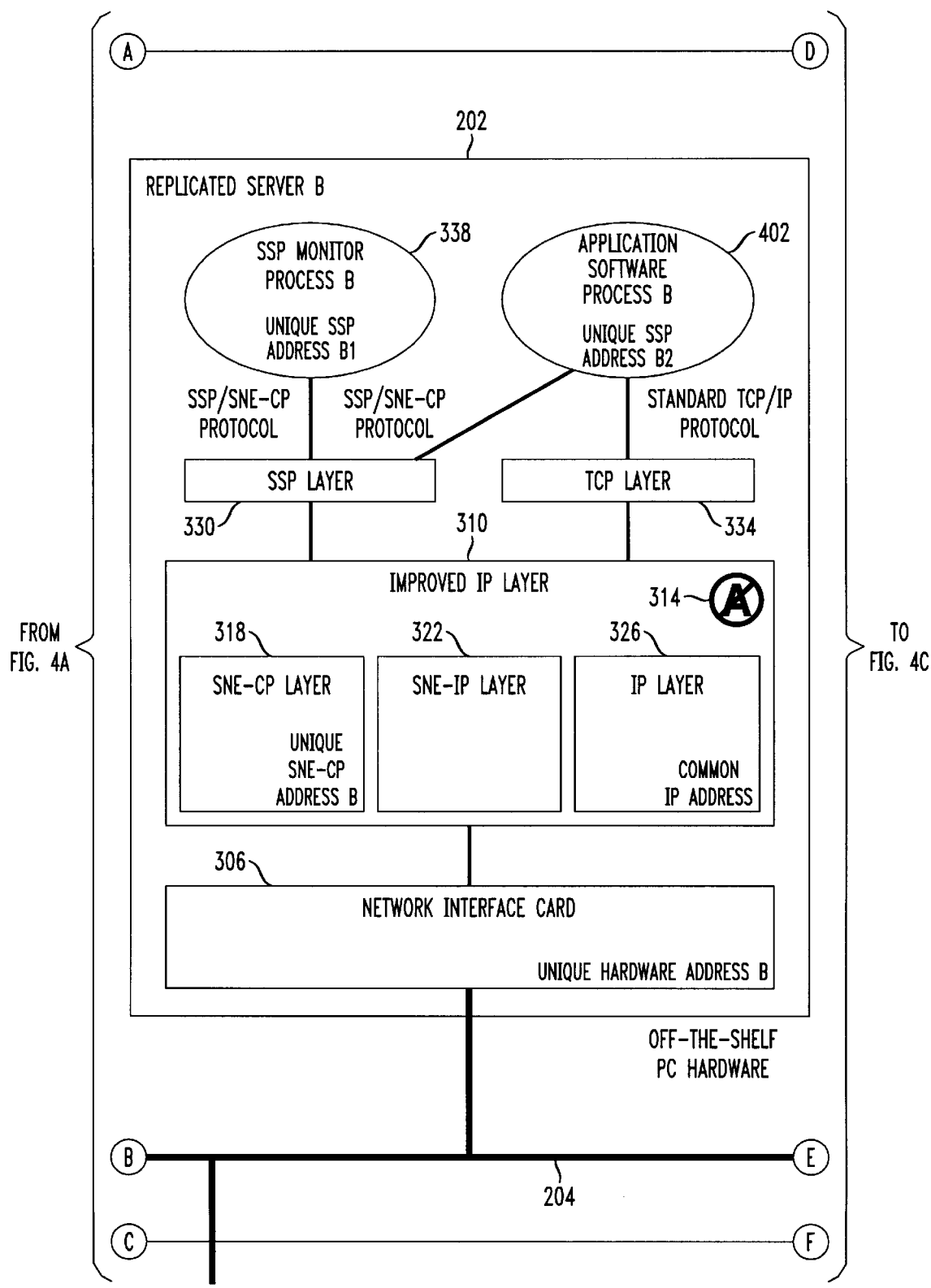
Figure 4C:
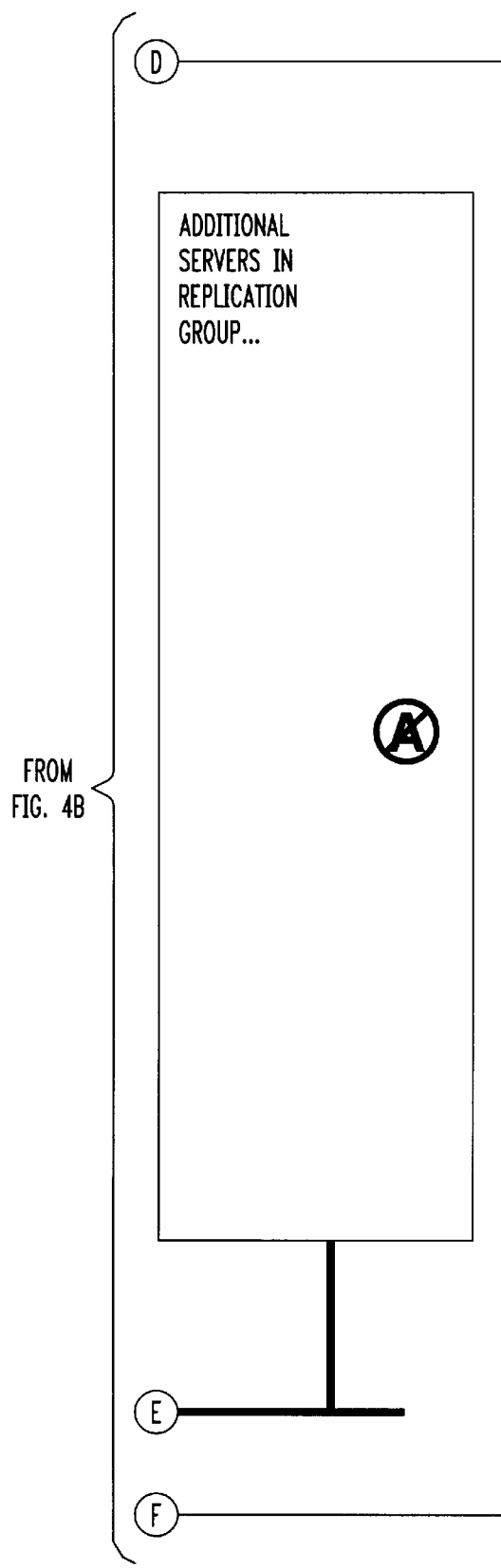

Like FIG. 3, FIG. 4 also shows a simplified functional block diagram of the software functions within a multiple server embodiment. However, in FIG. 4, the servers 200, 202 are executing software applications 400, 402 (i.e. non-legacy applications) specifically designed to take advantage of the present invention. More particularly, these software applications 400, 402 can communicate directly with the SSP layers 328, 330. One primary advantage of using these new software applications 400, 402 is in distribution of load and/or tasks. For example, software application 400 can communicate via the SSP layer 328 to SSP monitor process 336 and inform SSP monitor process 336 that a soft switch for certain loads and/or tasks is desired. SSP monitor process 336 would then proceed to soft switch the loads and/or tasks to another server 202.

Another major advantage of using new, SSP-aware software applications 400, 402 is that the applications can be programmed such that an inactive process 402 tracks the state of the active process 400. Then if a soft switch becomes necessary the inactive process 402 can become the active process, and continue any transactions that process 400 had not completed. In this case, the switch from active process 400 to the newly active process 402 occurs with complete transparency to router 206, and all connected clients 210. The switch occurs with no interruption at all of the IP conversations, and with virtually no delays incurred.

Figure 5:
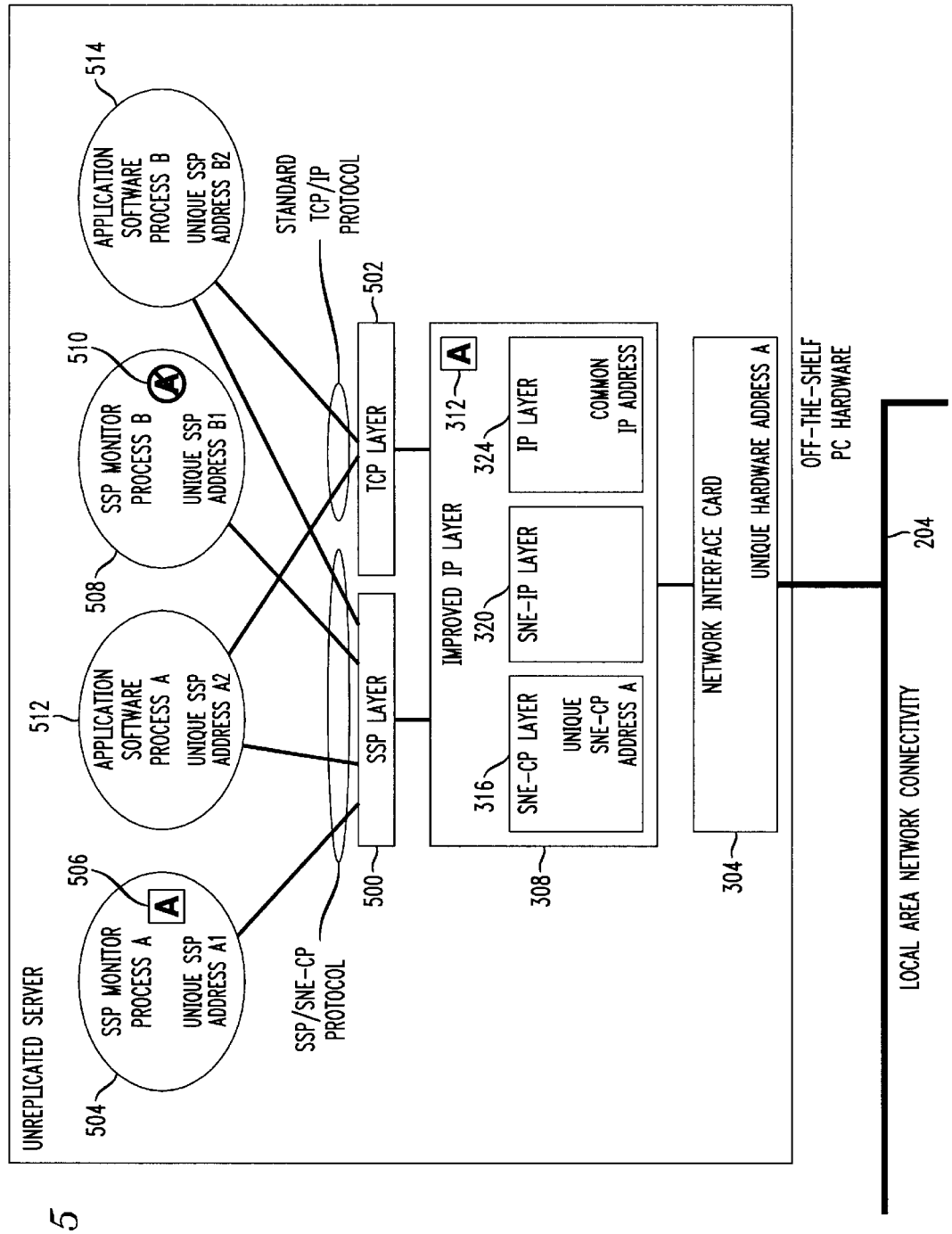
FIG. 5 shows a simplified functional block diagram of the software functions within a single server embodiment of the present invention.

FIG. 5 shows a simplified functional block diagram of the software functions within a single server embodiment of the present invention. The LAN 204 and improved IP layer 308 in this embodiment are the same as in the multiple server embodiment. The SSP layer 500 is the same layer that was present in FIGS. 3 and 4 as SSP layers 328, 330. The TCP layer 502 is the same layer that was present in FIGS. 3 and 4 as TCP layers 332, 334. However, SSP monitor processes 504, 508 differ from the multiple server embodiment in that they have active/inactive flags 506, 510 to indicate which instance of the application software is active. Also, in the single server embodiment, software processes 512, 514 are required to be aware of the SSP layer 500.

TCP layer 502 passes TCP/IP messages to and from software applications 512, 514, and SSP monitor processes 504, 508 monitor the software applications 512, 514. Again, software applications 512, 514 need only be functionally equivalent. For example, application 514 can be a mirror image of application 512, a restarted instance of application 512, or a standby process of application 512. Thus, if software application 512 were to fault, application execution would be "soft switched" to software application 514. In other words, software application 512 would start responding to requests from the client 210.

The speak no evil ("SNE") principle employed in the multiple server embodiment is very similar to the SNE principle used in the single server embodiment, except that the responsibility for throttling traffic from an inactive application process 514 lies with that process itself. Each SSP monitor process 504, 508 has its own flag 506, 510, and the application software processes 512, 514 are aware of the state of their respective flags. These flags 506, 510 identify which SSP monitor process 504, 508 and software application 512, 514 is active. When flag 506 is set, application software process 512 is active and 512 is permitted to respond to requests from the client 210. Similarly, when flag 510 is not set, then application software process 514 is inactive and is not permitted to respond to client 210 requests. Enforcement of these rules are left to the software designers of SSP monitor processes 504, 508 and application software processes 512, 514.

It should be noted that the present invention could easily be used in many different contexts. For example, the present invention could be used with an array of processors interconnected on an Ethernet using an IP based communications performing telephone switch administration functions, such as billing and Operation Support System ("OSS") interfaces which directly support the daily operation of the telecommunications infrastructure. Similarly, the present invention could be implemented in conjunction with an array of processors controlling external equipment such as Message Switch Ethernet Interface Boards in the 5ESS® switch commercially available from Lucent Technologies, Inc. Further, the present invention could be used with an array of processors that are communicating with a second array of processors via a dual Ethernet where it is necessary for communications to be soft switched from one network to the other network.

Thus, the present invention has been described in the foregoing specification with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

What is claimed is:

1. A server in a client/server network using an improved TCP/IP protocol comprising:

a. a processor executing a first software application and a second software application; and b. a computer-readable medium having stored thereon:
   i. a first monitoring process stored in a first region of a first range of memory addresses in the computer-readable medium, said monitoring process monitoring execution of said first software application,
   ii. a first active process flag stored in a second region of a second range of memory addresses in the computer-readable medium, said first active process flag identifying said first software application as being active when said first active process flag is set,
   iii. a second monitoring process stored in a third region of a third range of memory addresses in the computer-readable medium, said monitoring process monitoring execution of said second software application,
   iv. a second active process flag stored in a fourth region of a fourth range of memory addresses in the computer-readable medium, said second active process flag identifying said second software application as being active when said second active process flag is set, and
   v. an IP address stored in a fifth region of a fifth range of memory addresses in the computer-readable, said IP address identifying said server in said client/server network.

2. The server of claim 1 wherein the first application and the second application are substantially equivalent.

3. The server of claim 2 wherein the second application is a mirror image of the first application.

4. A plurality of servers in a client/server network, said plurality of servers using an improved TCP/IP protocol, said plurality of servers comprising:
   a. one of said plurality of servers including a first computer-readable medium having stored thereon:
      i. a first IP address stored in a first region of a first range of memory addresses in the first computer-readable medium,
      ii. a first active server flag stored in a second region of a second range of memory addresses in the first computer-readable medium, said first active server flag identifying said one of said plurality of servers as an active server when said first active server flag is set; and
   b. another of said plurality of servers including a second computer-readable medium having stored thereon:
      i. a second IP address stored in a third region of a third range of memory addresses in the second computer-readable medium,
      ii. a second active server flag stored in a fourth region of a fourth range of memory addresses in the second computer-readable medium, said second active server flag identifying said another of said plurality of servers as the active server when said second active server flag is set,
whereby each of said plurality of servers receive client requests and each of said plurality of servers mirror actions performed by the active server, but only the active server is allowed to respond to the client requests.

5. The plurality of servers in claim 4 wherein said second IP address is identical to said first IP address.

6. The plurality of servers in claim 5 wherein each of said plurality of servers further comprises an interface to said client/server network.

7. A plurality of servers in a client/server network, said plurality of servers using an improved TCP/IP protocol, each of said plurality of servers comprising:
   a. a processor executing a software application;
   b. a computer-readable medium having stored thereon:
      i. an IP address stored in a first region of a first range of memory addresses in the computer-readable medium, the IP address of each of said plurality of servers being identical,
      ii. an active server flag stored in a second region of a second range of memory addresses in the computer-readable medium, said first active server flag identifying said one of said plurality of servers as an active server when said active server flag is set,
      iii. a monitoring process monitoring execution of said software application; and
   c. an interface to the client/server network, said interface having a unique hardware address that identifies the server on the client/server network,
whereby each of said plurality of servers receive client requests and each of said plurality of servers mirror actions performed by the active server, but only the active server is allowed to respond to the client requests.

8. A method of switching execution of an application from a first processor to a second processor, said method comprising the steps of:
   a. terminating execution of the application on the first processor;
   b. sending a first message to start execution of the application on the second processor; and
   c. sending a second message signaling that the start of execution of the application on the second processor was successful.

9. A method of switching execution of an application from a first processor having a first active flag to a second processor having a second active flag, said method comprising the steps of:
   a. sending a first message signaling that a switch is about to take place;
   b. terminating execution of the application on the first processor;
   c. sending a second message to toggle the first active flag and the second active flag; and
   d. sending a third message to the second monitoring task to start execution of the application on the second processor.

10. The method of claim 9 further comprising the step of sending a fourth message to signal that execution of the application on the second processor was successfully started.

11. A method of switching execution of an application from a first processor, having a first monitoring task and a first active flag, to a second processor, having a second monitoring task and a second active flag, said method comprising the steps of:
   a. sending a first message from the first monitoring task to the second monitoring task that a switch is about to take place;
   b. the second monitoring task acknowledging the first message from the first monitoring task;
   c. the first monitoring task terminating execution of the application on the first processor;
   d. sending a second message to toggle the first active flag and the second active flag;
   e. sending a third message to the second monitoring task to start execution of the application on the second processor; and
   f. sending a fourth message from the second monitoring task that the start of execution of the application on the second processor was successful.

12. A method of switching execution of an application from a first computer having a first active flag to a second computer having a second active flag, said method comprising the steps of:

a. sending a first message signaling that a switch is about to take place;

b. terminating execution of the application on the first computer;

c. sending a second message to toggle the first active flag and the second active flag; and d. sending a third message to the second monitoring task to start execution of the application on the second computer.

13. The method of claim 12 further comprising the step of sending a fourth message to signal that execution of the application on the second computer was successfully started.

14. A method of starting a plurality of computers on a network, each of said plurality of computers having an active server flag, said network including a router, said method comprising the steps of:

a. one of said plurality broadcasting an SNE-CP message to the network;

b. said router updating at least one routing table to reflect that said one of said plurality is an active server;

c. said one of said plurality waiting for a time period;

d. if a response is received from another of said plurality within said time period, said one of said plurality setting its said active server flag to inactive and said another of said plurality informing said router that said another of said plurality of computers is the active server; and e. if said response is not received from said another of said plurality of computers within said time period, said one of said plurality setting its said active server flag to active.

15. A server in a client/server network using an improved TCP/IP protocol comprising:

a. means for executing a first software application and a second software application;

b. first monitoring means for monitoring execution of said first software application;

c. first active process means for identifying when said first software application is active, said first monitoring means communicating with said first active process means, said first monitoring means informing said first active process means when said first software application is active;

d. second monitoring means for monitoring execution of said second software application;

e. second active process means for identifying when said second software application is active, said second monitoring means communicating with said second active process means, said second monitoring means informing said second active process means when said second software application is active; and f. IP means for identifying an IP address for the server, said IP address identifying said server in said client/server network.

16. A plurality of servers in a client/server network, said plurality of servers using an improved TCP/IP protocol, each of said plurality of servers comprising:

a. means for executing a software application;

b. means for storing an IP address, the IP address of each of said plurality of servers being identical;

c. means for monitoring execution of said software application;

d. active server means for identifying an active server, said active server means identifying said one of said plurality of servers as the active server;

e. interfacing means for interfacing with the client/server network, said interfacing means having a unique hardware address that identifies the server on the client/server network, whereby each of said plurality of servers receive client requests and each of said plurality of servers mirror actions performed by the active server, but only the active server is allowed to respond to the client requests.

17. A method of communicating between a plurality of computers on a client/server network using a plurality of protocols, said client/server network having at least one router, said method comprising the steps of:

a. said at least one router receiving a message formatted in a first protocol of said plurality of protocols;

b. said at least one router translating said message into a first translated message, said first translated message being formatted in a second protocol of said plurality of protocols;

c. said at least one router sending said first translated message to at least one of said plurality of computers;

d. said at least one of said plurality of computers translating said first translated message into a second translated message, said second translated message being formatted in a third of said plurality of protocols; and e. said at least one of said plurality of computers sending said second translated message to at least another of said plurality of computers.

* * * * *